United States Patent [19]

Stephen et al.

[11] Patent Number: 5,353,914

[45] Date of Patent: Oct. 11, 1994

[54] MECHANISM AND METHOD FOR ORIENTING ARTICLES

[75] Inventors: John E. Stephen, Twinsburg; John R. Baclawski, Streetsboro, both of Ohio

[73] Assignee: R&G Sloane Mfg. Co., Little Rock, Ark.

[21] Appl. No.: 52,759

[22] Filed: Apr. 27, 1993

[51] Int. Cl.$^5$ ............................................. B65G 47/12
[52] U.S. Cl. .................................... 198/443; 198/392
[58] Field of Search ............... 198/382, 392, 394, 396, 198/443

[56] References Cited

U.S. PATENT DOCUMENTS

| 847,451 | 3/1907 | Wilmore | 198/443 X |
| 2,849,099 | 8/1958 | Halaran et al. | 198/392 |
| 4,984,678 | 1/1991 | Fauchard | 198/443 |

FOREIGN PATENT DOCUMENTS

| 0228736 | 7/1987 | European Pat. Off. | 198/392 |
| 2305709 | 12/1990 | Japan | 198/443 |
| 1313634 | 5/1987 | U.S.S.R. | 198/392 |

Primary Examiner—James R. Bidwell

[57] ABSTRACT

The method of orienting plastic pipe fittings in predetermined positions by passing the fittings downwardly through an inclined, rotating tube having a relatively smooth-walled bore so that the frictional agitation of the gravitating articles permits them to settle into a predetermined position with the center of mass in the lowermost possible position. The rate of rotation and the angle of incline are adjusted for different articles, and tubes of three different sizes are provided for interchangeable use. Two pairs of supporting rollers on opposite sides of the tube position are engageable with axially spaced annular collars on the tubes, the collars being sized to hold the tubes at the same discharge level and one of the rollers of each pair being driven by a variable speed motor to rotate the tube.

7 Claims, 2 Drawing Sheets

MECHANISM AND METHOD FOR ORIENTING ARTICLES

BACKGROUND OF THE INVENTION

This invention relates to the orientation of articles of manufacture, and relates more particularly to a mechanism and method for orienting a series of similar articles of asymmetrical size and shape into a particular position, or attitude, and in single file in a materials-handling process, to facilitate the performance of a subsequent operation such as labeling or packaging of the articles.

In the past, there have been numerous proposals of orienting methods and mechanisms, for use with a variety of different products. For example, bottling plants use rail systems to arrange bottles upright in rows, and a somewhat similar method is shown in U.S. Pat. No. 1,908,855 for orienting generally cylindrical cups on a conveyor belt. Counter-rotating and downwardly inclined shafts can be used to orient oblong articles, as illustrated by U.S. Pat. No. 4,274,531, with a variation shown in Pat. No. 2,403,862 for oblong articles like ammunition cartridges.

Other mechanisms and methods using rotating drums or tubes have been used for the separation and alignment of articles from a bulk supply to a single file. For example, a conical drum with internal wings is proposed in U.S. Pat. No. 4,984,678 to separate packages in a flow from a bulk source, but with no apparent concern for orientation of the packages in any particular position. Pat. No. 3,426,881 recognizes the possibility of using a rotating feeding tube for articles to be aligned, but only as a first step leading to rotating conveying rollers for accomplishing alignment of the articles. Pat. No. 2,822,076 uses a rotating drum to convey balls or pellets longitudinally of the drum, with a special spreader at the discharge end of the drum and with no concern for orientation of the articles.

The present invention is concerned with the orientation of asymmetrical articles such as plastic pipe fittings in the form of "L"'s, "T"'s, adaptors, caps and the like, which are of irregular shapes making prior orientation methods and mechanisms unsuitable. These articles must be handled in very large numbers by manufacturers or suppliers, and require orientation for labeling, stamping and other secondary operations. At the same time, such articles are relatively inexpensive so that manual handling can be prohibitively expensive. Accordingly a need has existed for a method and mechanism for receiving such articles in random positions from a bulk supply and orienting the articles into a given position or attitude preparatory to the performance of another operation.

SUMMARY OF THE INVENTION

The present invention provides a novel method and mechanism for accomplishing the rapid and relatively inexpensive automatic orientation of asymmetrical or irregularly shaped articles from a bulk supply into a single file of the articles with each article disposed in a predetermined orientation for another operation. This is accomplished by feeding a stream of the articles in random positions into the upper end of a relatively smooth-bored hollow tube that is supported in a downwardly inclined position for gravitation of the articles down the tube, and rotating the tube about its longitudinal axis at a selected rate that causes the friction between the articles and the rotating tube to agitate the articles as they slide down the tube, thereby allowing the center of mass of each article move to the lowermost position and achieve an equilibrium state by the time the article reaches the lower end of the tube. Thus, each article is positioned with its center of mass in the same position, and this orients the articles in the same, predetermined position for discharge from the tube.

Rotating tubes of different sizes are used for parts of different sizes and both the angle of incline and the rate of rotation of the tube are adjusted for good performance with each category of article. Optimum operating conditions for each article can be determined empirically, using trial and error to find the most effective angle, rate of rotation and tube size. For the principal categories of plastic pipe fittings it has been found that a tube size in the range of four inches to ten inches and an angle of incline in the range of 3 degrees to 12 degrees usually is satisfactory, with a rate of tube rotation between 20 and 70 revolutions per minute (r.p.m.). Three different tube sizes have been found to be desirable—ten inches in diameter for two-inch diameter pipe fittings, six inches in diameter for one-inch fittings, and four inches in diameter for one-half inch fittings. Three-quarter inch fittings can be handled by either four- or six-inch tubes, after experimentation to determine which works best. The preferred material for the tubes is aluminum (plastic will also work), which is relatively smooth-walled but develops sufficient friction with plastic pipe fittings for lateral agitation.

The preferred embodiment of the mechanism of the invention comprises a base upon which the elongated tube is rotatably supported in an inclined position, preferably on a tiltable platform having a hinge at one end and a selectively operable height-adjusting mechanism at the other for changing the angle of incline. For interchangeability of tubes to handle different articles, at least one tube of a different size is provided, and the supporting and driving means is designed to accept the different sized tubes and hold them in the same operating position on the platform.

Herein, this is accomplished by supporting the selected tube on two laterally spaced rollers and providing on the tube a circular external support surface larger in diameter than the spacing of the rollers so as to be "nested" on the rollers and rotated when one of the rollers is driven. The support surfaces on the interchangeable tubes are the circular peripheries of annular collars on the tubes, the collars being sized to position the underside of each tube at the same level above the platform for discharge of the oriented parts onto a moving conveyor. Two sets of similar supporting and driving rollers preferably are spaced apart along each tube.

For bulk supply of articles to the tube, a hopper is mounted on the upper end of the tiltable platform to receive articles from a supply conveyor and provided with a discharge opening aligned with the upper end of the tube. A different face plate can be provided for the hopper with an outlet opening for each size of tube, and a vibrator preferably is provided to shake the hopper to release parts into the tube. Other features and advantages of the invention will become apparent from the following detailed description, taken in conjunction with the accompanying drawings of the preferred embodiment.

DETAILED DESCRIPTION OF THE PREFERRED EMBODIMENT

Figure 1:
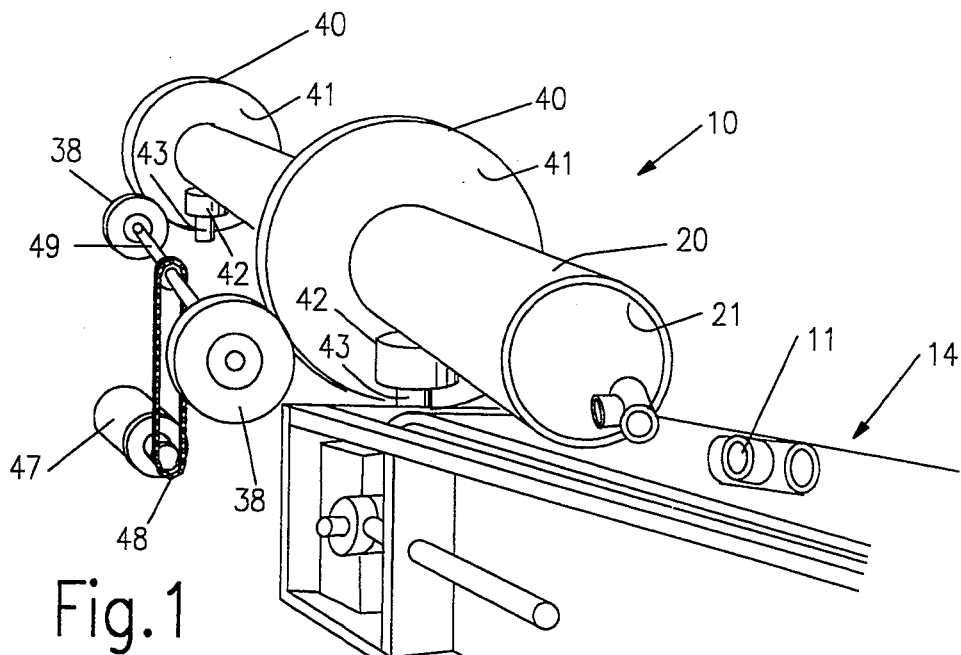
FIG. 1 is a fragmentary and somewhat schematic perspective view of an orienting mechanism according to the present invention, with parts removed for clarity of illustration.

As shown in the drawings for purposes of illustration, the invention is embodied in a mechanism, indicated generally by the reference number 10, for receiving and orienting a flow of asymmetrical or irregular articles, herein plastic pipe joints 11 (FIG. 1) in the form of "T"'s. These articles are bulk supplied by a suitable conveyor 12 (FIG. 4) and fed into a hopper 13, and then are oriented automatically in passing from the hopper through the mechanism 10, for delivery to a subsequent operation.

Figure 2:
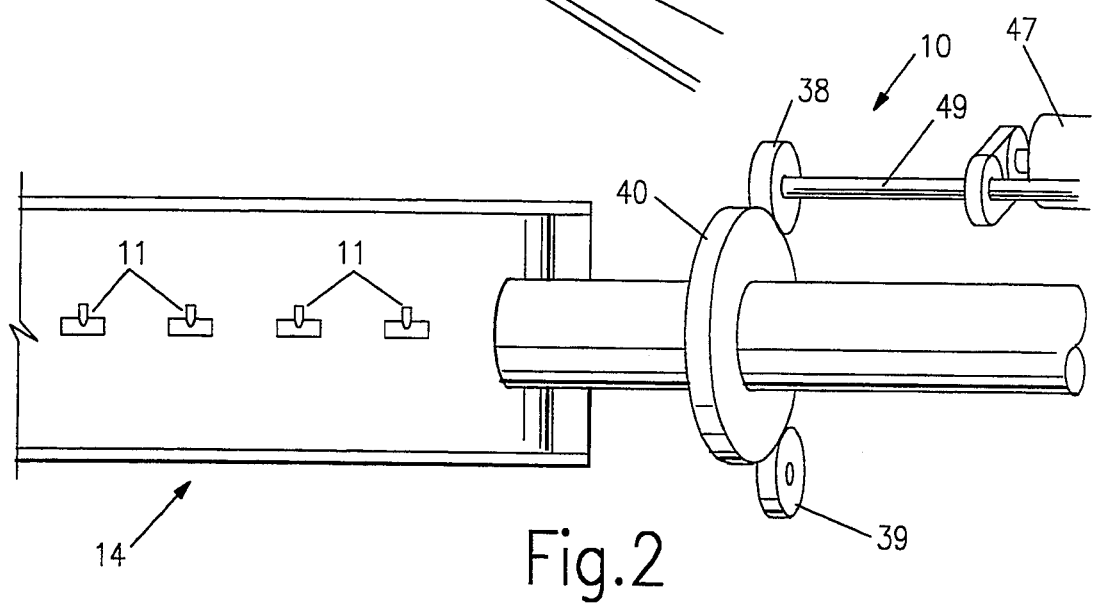
FIG. 2 is a top plan view of a portion of the mechanism of FIG. 1, again with parts removed for clarity of illustration.
Figure 4:
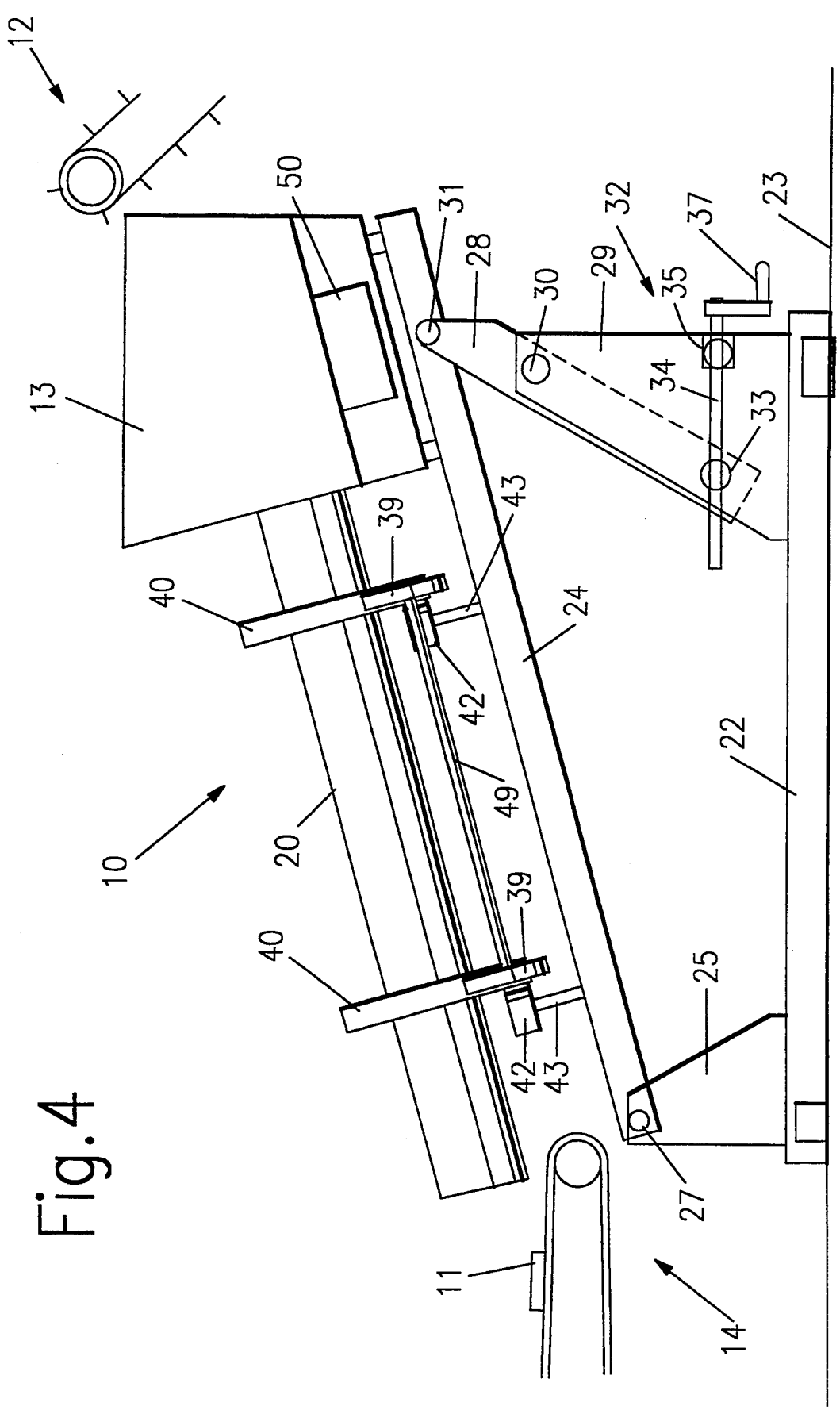
FIG. 4 is a side elevational view of the mechanism of FIG. 1, with parts broken away at each end of the mechanism.

As can be seen in FIGS. 1 and 4, the illustrative mechanism 10 herein deposits the parts on an endless belt conveyor indicated generally by the reference number 14, for delivery to the subsequent operation, which may be an automatic machine (not shown) for applying a label or stamp in a standard position on each pipe joint 11. As can be seen in FIGS. 1 and 2, the illustrative pipe joints have main sleeve-like tubular bodies and right-angle sleeves shown as being of a different size. For example, the main body may be a one-inch diameter sleeve, while the right-angle sleeve is only three-quarters of an inch in diameter. What is important, however, is that these are relatively inexpensive, lightweight articles that must be processed rapidly and in large numbers through a subsequent operation that is greatly facilitated if the articles are oriented in a predetermined position so that automatic machinery can perform the subsequent operation.

In accordance with the present invention, the article-orienting mechanism 10 comprises an elongated tube 20 having a relatively smooth-walled bore 21 that is substantillay larger than the articles to be oriented, and means supporting the tube in a downwardly inclined position from the supply hopper 13 and for rotation about the longitudinal axis of the tube, to receive articles from the hopper and agitate the articles as a result of the tube's rotation while the articles gravitate down the tube. With this mechanism, the frictional engagement of the rotating tube with the sliding articles frees the articles for movement under the force of gravity into the orientation in which the center of mass of each article is in the lowermost possible position. This orientation is the predetermined position in which all of the articles are oriented as they exit from the lower end of the tube.

Optimum effectiveness of the orienting mechanism 10 is achieved by using tubes of different sizes for articles of different sizes so the preferred embodiment of the present invention includes two or more interchangeable tubes of different sizes, herein three, numbered 20, 20$^a$ and 20$^b$ (FIG. 3), and the supporting means is designed to support each of these tubes with its lower side in the same position for uniform discharge of articles onto the receiving conveyor 14. The angle of tilt of the tubes and the rate of rotation also are selectively adjustable to provide the optimum angle and rate for each size and shape of article to be oriented.

More specifically, the preferred embodiment shown herein comprises as base 22 (FIG. 4) adapted to be positioned on a floor or other supporting surface 23 between the supply conveyor 12 and the receiving conveyor 14, and an elongated, inclined platform 24 disposed above the base and supporting one of the orienting tubes with one end of the tube positioned at the hopper 13 to receive the articles and the other end overlying the receiving conveyor to deposit oriented articles thereon. The lower end of the inclined platform is hingedly connected to a pedestal 25 upstanding from the base for tilting of the platform about a horizontal transverse axis defined by pivots 27, and the opposite, upper end of the platform is positioned by an adjustable support 28 on a second pedestal 29 near the other end of the base. The adjustable support may be of various forms, but herein is a rocker arm that is supported between its ends on a pivot 30 on the pedestal 29 and extends upwardly to a connecting pivot 31 on the platform, and downwardly from the rocker pivot 30 to a screw mechanism 32 for swinging the lower end of the rocker back and forth above the base. The illustrative screw mechanism includes a nut 33 connected to the lower end portion of the rocker, an elongated threaded screw 34, a bearing 35 rotatably supporting the screw in an axially fixed position on the pedestal 29, and a crank 37 for back and forth manual turning of the screw. Such turning moves the nut 33 to the right and left along the screw, thus raising and lowering the upper end of the platform to adjust its angle of inclination. It can be seen that the preferred embodiment provides for precise adjustment of this angle between a lowered position in which the angle of inclination of the tube is in the range of about eight to ten degrees with the horizontal, and a raised position in which the angle of inclination is in the range of about fifteen to twenty degrees with the horizontal. The particular angle to be used will depend upon the size and weight of the particular articles and other conditions, and can be determined empirically, through trial-and-error experimentation, to obtain a smooth and effective flow rate for articles along the tube.

Figure 3:
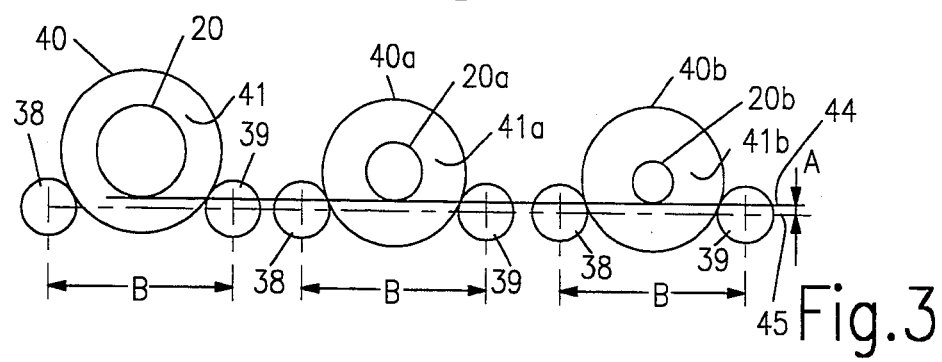
FIG. 3 is a schematic view showing the relationship of orienting tubes of three different sizes equipped with supporting collars engaged with supporting and driving rollers, the views being taken substantially along line 3—3 of FIG. 1.

To support the selected tube 20, 20$^a$, 20$^b$ on the platform 24, at least one pair of rollers 38 and 39 are spaced apart on opposite sides of the tube's position, as shown most clearly in FIGS. 2 and 3, and supported for rotation about axes parallel to the longitudinal axis of the tube in supporting engagement with a circular support surface 40 on, and coaxial with, the tube. The diameter of the support surface 40 is larger than the spacing of the rollers so as to nest rotatably between them. Herein, two sets of such rollers 38 and 39 are spaced apart longitudinally of the tube's position, and two circular support surfaces 40 are provided on each tube, as the peripheral surfaces of two annular collars 41 on each tube, spaced apart axially for engagement with the two sets of rollers. Means are provided for securing each tube against axial displacement, herein shown as two locating rollers 42 rotatably mounted on upright shafts 43 to hold the locating rollers in engagement with the lower sides of the collars 41.

The schematic illustration in FIG. 3 shows three different sizes of tubes, the first 20, on the left, representing a ten-inch diameter tube; the second 20$^a$, in the center, representing a six-inch diameter tube; and the third 20$^b$, on the right, representing a four-inch diameter tube. It is to be understood that these dimensions are illustrative only, and are not to be taken as limiting in any way. While the lengths of the tubes are not critical, they are made long enough to insure proper orientation of the parts gravitating through the tube, six to eight feet being acceptable. The illustrative tubes are composed of aluminum. Plastic will also work.

Each tube is shown in FIG. 3 as nested between two rollers 38 and 39 and having a collar (41, 41$^a$ and 41$^b$) with an outside surface (40, 40$^a$ and 40$^b$) that is nested between the rollers so that the tube is rotatably supported by the collar and the rollers. It will be seen that the underside of each tube lies on, and is tangent to, an imaginary line 44 which represents the discharge level of the tube, and is spaced above a line 45 by a distance indicated at A, this distance being the same for each tube. The lower line 45 represents the upper surface of the receiving conveyor 14, and A is the distance the articles drop from each tube to the conveyor. Thus, by proper sizing of the collars 41, 41$^a$ and 41$^b$, the three tubes are made easily interchangeable without affecting the manner of discharge of articles to the receiving conveyor.

At least one of the rollers 38, 39 is driven to rotate the tube, and the other roller of that pair may be simply an idler roller. Herein, two rollers 38 on one side of the tube position are driven in unison, by a suitable variable speed motor 47 through a chain drive 48 and a drive shaft 49. With this arrangement, the selected tube is rotated at a selected rate, typically within the range of 20 rpm to 70 rpm.

Feeding of articles from the hopper 13 into the upper end of the rotating tube (20, 20$^a$ or 20$^b$) is accomplished by providing a suitable outlet opening (not shown) in the side of the hopper and positioning the upper end of the tube against the hopper around this opening. A conventional power vibrator 50 is provided to shake the hopper while the mechanism is in operation, agitating the articles in the hopper for release into the tube.

With the foregoing arrangement, a tube 20, 20$^a$ or 20$^b$ of the desired size for a particular article to be handled can be installed on the tiltable platform 24 and the supply conveyor 12 can be started to deliver articles to the hopper 13. The vibrator 50 is started and articles are released in a stream into the upper end of the rotating tube to slide down the tube at a selected rate determined primarily by the angle of incline of the tube and the rate of rotation. By adjusting the angle and rate during operation, the flow rate can be optimized while, at the same time, the amount of lateral agitation also is optimized for the particular article being oriented. Throughput on some parts can be as high as 300 parts per minute or more.

From the foregoing, it will be evident that the present invention provides a novel and effective method for orienting asymmetrical parts in a relatively simple manner well suited for use with plastic pipe fittings and the like, with an elongated, relatively smooth-bored tube that is supported in a selected inclined position and rotated as a rate that is selected to suit the particular articles being handled. Moreover, the invention provides a novel and relatively simple mechanism for practicing the method, including the interchanging of tubes of different sizes for articles of different sizes.

It also will be apparent that, while a particular embodiment of the invention has been illustrated and described in detail, various modifications and changes may be made by those skilled in the art without departing from the spirit and scope of the invention.

We claim as our invention:

1. Mechanism for orienting articles of uniform size and asymmetrical shape, comprising:

a base;

a platform disposed above said base;

means adjustably positioning the platform relative to said base including a hinge at one end of the platform supporting the platform for tilting movement about a transverse hinge axis, and an adjustable support for the opposite end portion of the platform holding the platform in a preselected angular position about the hinge axis with the opposite end portion of the hopper elevated;

a supply hopper mounted on the elevated end portion of the platform and having a discharge opening for releasing articles downwardly toward the platform;

an elongated, hollow tube disposed above said platform and having an open upper end adjacent said hopper to receive articles from the discharge opening and an open lower end adjacent the lower end of the platform for releasing the articles, said tube having a relatively smooth-walled bore of circular cross-section of a preselected size substantially larger than the articles to be oriented;

means supporting said tube on said platform for rotation about the longitudinal axis of the tube, including two rollers positioned along said tube and spaced apart transversely thereof, and a circular support surface coaxial with said tube having an outside diameter larger than said preselected distance and nested between said rollers to be supported thereby with the underside of the tube at a preselected level above the platform;

a variable speed motor drivingly coupled to one of said rollers to rotate said tube at a selected rate of rotation thereby to agitate the articles laterally as the articles gravitate down the tube;

and at least one additional elongated tube similar to, and interchangeable with, the first-mentioned tube and having a bore of substantially different size for use in orienting articles of a substantially different size, said additional tube also having a coaxial circular support surface having an outside diameter larger than said preselected distance and different from the outside diameter of the surface of the first-mentioned tube to support the underside of the additional tube at said preselected level above the platform;

the angle of said platform and the rate of rotation of said drive rollers being adjustable to provide selected gravitation and agitation rates and said tubes being interchangeable for different sizes of parts.

2. Orienting mechanism as defined in claim 1 having three interchangeable elongated tubes having bores of different diameters for use with articles of three different sizes, each of said tubes having a coaxial external collar encircling the tube and having a circular peripheral surface forming the support surface for engagement with said drive rollers, said collars having support surfaces of different diameters for holding the underside of each tube at the same level relative to the platform.

3. Orienting mechanism as defined in claim 1 wherein said means supporting said tube further comprises two additional rollers similar to the first rollers and spaced from the first rollers axially of said tubes, each of said tubes having a second support surface spaced from the first support surface for engagement with the second rollers.

4. Orienting mechanism as defined in claim 1 in which said adjustable support comprises a rocker pivotally supported between its ends on said base beneath the elevated end portion of said platform and having an upper end portion swingable upwardly and downwardly to increase and decrease the angle of the platform, and a screw mechanism connected to said rocker arm to swing said rocker arm upwardly and downwardly.

5. Mechanism for orienting articles of uniform size and asymmetrical shape, comprising:
   a base;
   an elongated tube having a relatively smooth-walled bore substantially larger than the articles to be oriented and having a discharge opening at one end;
   supporting means for holding said tube on said base in an inclined position with the lower side of the tube disposed at a selected downwardly inclined angle and the discharge opening at the lower end of the tube, and also rotatably supporting the tube;
   a power actuator for rotating the tube at a selected rate of rotation;
   and a feeder for introducing articles to be oriented one by one into the upper end portion of the tube to gravitate down the tube while the latter is rotating, said angle and said rate of rotation being selected to cause the articles to slide down the tube while being agitated laterally along the curvature of the tube to cause the center of mass of each article to assume a predetermined position;
   whereby the articles reaching the discharge opening are oriented in the same position for discharge from the tube; and including at least one additional elongated tube similar to the first-mentioned tube and having a different size of bore for orienting articles of different characteristics, said supporting means being operable to support and rotate either of said tubes.

6. Orienting mechanism as defined in claim 5 wherein said supporting means for the tube comprises at least one pair of rollers spaced apart on said supporting means to lie on opposite sides of the tube and operable to support whichever of the tubes is in place on said rollers.

7. Orienting mechanism as defined in claim 6 wherein said power actuator rotates one of said rollers.

* * * * *